Feb. 26, 1963  M. BIER  3,079,318
ELECTRICAL FILTERING PROCESS AND DEVICE
Filed Jan. 15, 1959  2 Sheets-Sheet 1

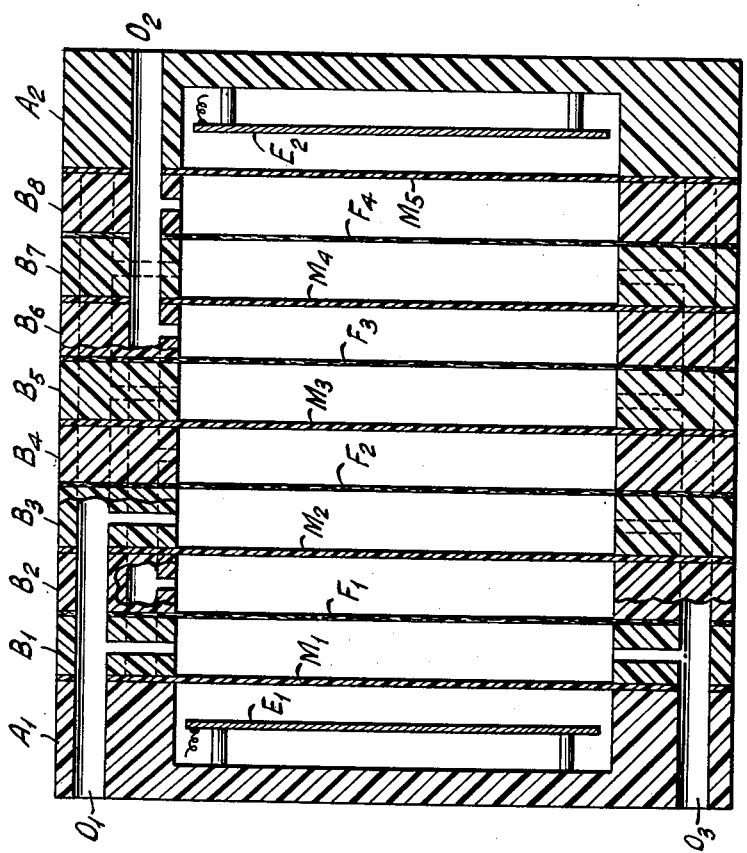
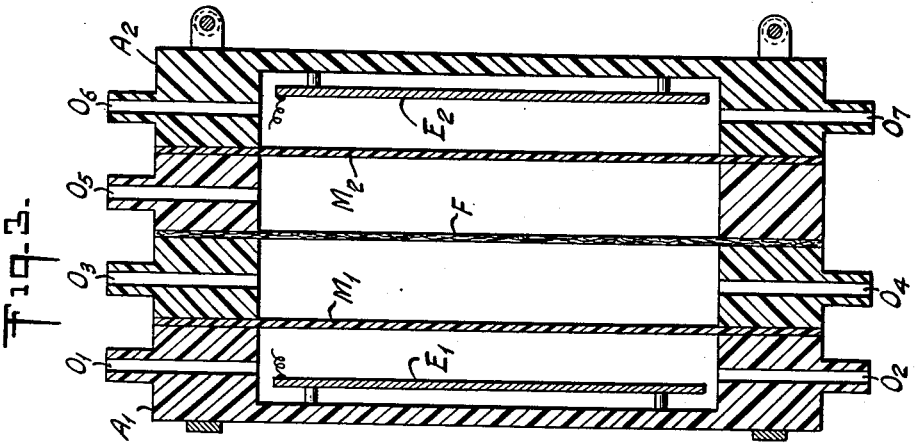

United States Patent Office 3,079,318
Patented Feb. 26, 1963

3,079,318
ELECTRICAL FILTERING PROCESS AND DEVICE
Milan Bier, New York, N.Y.
(2508 E. 8th St., Tucson, Ariz.)
Filed Jan. 15, 1959, Ser. No. 787,006
10 Claims. (Cl. 204—180)

The invention relates to improvements in filtering methods and apparatus.

A principal object of the invention is to provide a method and apparatus increasing the selectivity of a filtering element so as to render it retentive to components of solutions or suspensions to which otherwise it would be permeable.

Another object of the invention is to provide a method to increase the capacity of a filtering element for the filtration of gelatinous precipitates which tend to clog the pores of such elements.

A still further object of the invention is to provide a method to increase the rate of filtration of certain components of a solution or suspension above the rate of filtration of the bulk of such solutions.

These and other objects and advantages are achieved by applying a direct current electric field in a direction across the filtering element. The invention will be described in more detail with reference to the accompanying drawings in which FIG. 1 shows diagrammatically a filtering apparatus using a flat filter surface in combination with an electric field;

FIG. 3 illustrates a filtering apparatus according to the invention where the electrodes are located in separate electrode compartments out of contact with the filtering fluid, and FIG. 4 shows a multiple filtering unit composed of a number of cells similar to those of FIG. 3.

Figure 1:
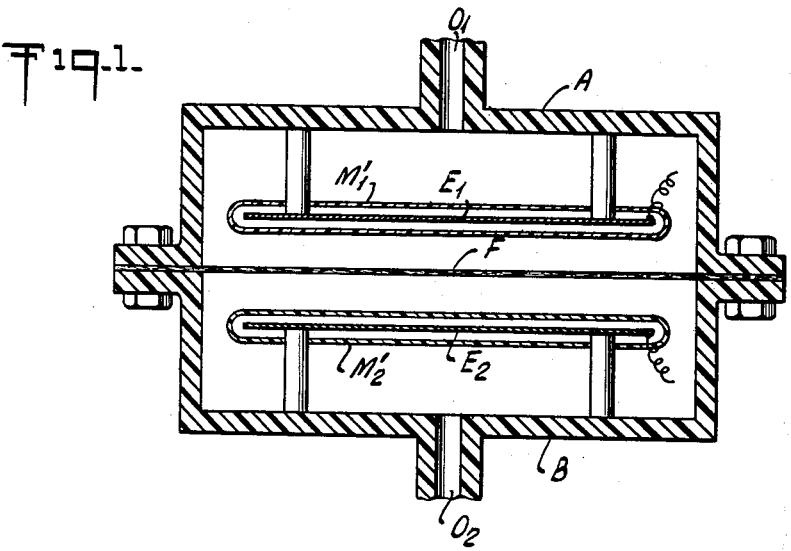

Referring to the drawings, FIG. 1 represents the simplest embodiment of an apparatus suitable to explain the principle of the invention. The apparatus comprises two compartments, the walls A and B of which are pressed together by suitable clamping means (not shown). Between the flanged edges, the filtering element F is inserted, while the electrodes $E_1$ and $E_2$ serve to establish an essentially uniform electric field across the filtering element. $O_1$ and $O_2$ are the two openings serving as inlet, resp. outlet for the solutions being filtered. The filtering apparatus, and consequently also the filtering element may be held in a horizontal, vertical or inclined position. The filtering elements may be made of filter paper, filter cloth, ceramics, or any other material, except metals.

Figure 2:
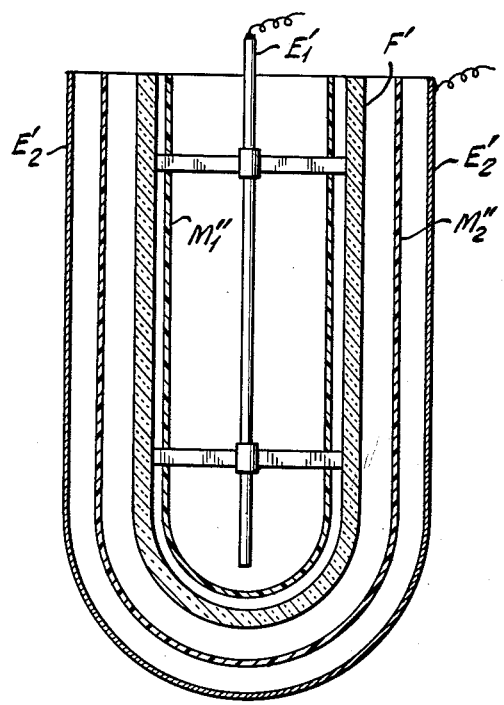
FIG. 2 is a cross-sectional view of a ceramic candle filter.

Ceramic filtering elements are frequently made in a round form, commonly referred to as filter candles. In this case, one of the electrodes should be in the center of the filtering element, the other outside, completely surrounding it. This is illustrated in FIGURE 2, showing a cross-section through the center of such an appartus. $E_1'$ is the center electrode, $F'$ is the round filter element, and $E_2'$ is the outside electrode completely surrounding the filter candle.

In both instruments, illustrated in FIGURES 1 and 2, the electric field may result in the formation of gases at the electrodes, in which case appropriate vents have to be provided. There is only one limitation as to the material which can be utilized for the construction of the apparatuses, and, that is that all material exposed to the electric field, has to be non-metallic, i. e. non-conductive of electricity. Only the electrodes can be metallic. If metallic components are desired, they have to be properly insulated by coating them with a non-conductive material, such as a glass or plastic, in all parts coming into contact with either the solution or the electrodes.

The electrodes are separated from the filtering element by material which allows the passage of the electric current without, however, allowing the free intermingling of the fluid surrounding the electrodes with the fluid which is being filtered. A suitable material for such a separation is dialyzing tubing, available in commerce under the trade name "Visking," which is the same material as used for sausage casing. Another suitable material is cellophane, when untreated for water repellency.

An apparatus embodying this principle is diagrammatically represented in FIGURE 3. The two electrodes $E_1$ and $E_2$ are located in the electrode compartments $A_1$ and $A_2$. They are separated from the two filter compartments $B_1$ and $B_2$, by means of two dialyzing membranes $M_1$ and $M_2$. The filtering element F is placed in between the two filter compartments. $O_1$, $O_2$, $O_6$ and $O_7$, are the inlets and outlets, through which the fluid surrounding the electrodes can be made to flow continuously, and, if desired, the contents of the anode and cathode compartments can be continuously remixed, to achieve a mutual neutralization of the acid and alkali formed at the electrodes. At the same time, the outlets for fluid can be also utilized to let out the gas formed at the electrodes, thus acting as gas vents. The filtering compartments can have either one ($B_2$) or two ($B_1$) or also more outlets, resp. inlets, their usefulness being explained hereinbelow.

Should one desire to increase the available filtering area, this can be achieved by either increasing the area of the individual filtering element, or by using a serial arrangement of several filtering elements, arranged essentially parallel to each other, in a manner akin to that employed in filter presses. In such an apparatus, each filtering surface is separated from the next one by at least one membrane of the type described above, which will not interrupt the passage of the electric current but will effectively prevent fluid flow or intermingling. In such an apparatus, two electrodes will be sufficient to establish the electric field across all the filtering elements. An apparatus embodying these principles is diagrammatically represented in FIGURE 4. The two electrodes $E_1$ and $E_2$ are located in the two electrode compartments $A_1$ and $A_2$, which are provided with inlets and outlets (not shown) for the circulation of buffer solutions and the venting of gases formed at the electrodes. In between, a series of filtering compartments $B_1$ to $B_8$ are interposed, separated from each other and from the electrode compartment by an alternate series of membranes and filtering elements, designated $M_1$ to $M_5$ and $F_1$ to $F_4$, respectively. The filtering compartments can be connected either in series or in parallel, or also each compartment may have independent outlets or inlets. In the apparatus shown, alternate compartments are connected in series. Thus, the ducts $O_1$ and $O_3$ serve to connect the filtering compartments $B_1$, $B_3$, $B_5$ and $B_7$, while the duct $O_2$ serves to interconnect the compartments $B_2$, $B_4$, $B_6$ and $B_8$.

The invention utilizes the principle that those suspended or dissolved constituents of a suspension or solution which possess an electric charge will be influenced by an electric field and will migrate towards the electrode carrying the opposite charge, at a rate which is defined by the equation $$d/t = uE$$

where $d$ is the distance (in cm.) travelled in the time $t$ (seconds) under the influence of the electric field E (volt/cm.), while $u$ is the characteristic electrophoretic mobility of the charged component (in cm.$^2$/volt sec.). It is an essential part of the invention that for best effects the linear rate of passage of the fluid being filtered through the filtering element be of the same order of magnitude as the above defined rate of electrophoretic migration. The linear rate of passage of fluid through the filtering element can be approximated by the ratio of volume of liquid filtered and the effective area of the filtering element $$d'/t' = v/A$$

where $d'$ is the linear distance travelled by the fluid in the time $t'$, $v$ being the volume of the liquid being filtered in the same time $t'$, and A the area of the filter element.

The operator has the choice of two polarities for the electric field. When gelatinous precipitates are filtered, and prevention of the clogging of the filter element is desired, the polarity will be so chosen that the suspended particles causing the clogging of the filter pores move under the influence of the electric field away from the filtering element, that is they move in the direction opposite to the direction of the flow of the liquid through the filtering element. The same polarity will be chosen when it is desired to make the filtering element impervious to some electrically charged components of the mixture to which it is normally permeable. To the contrary, if it is desired to specifically increase the rate of filtration of one electrically charged component of the solution over the rate of filtration of the bulk of the fluid, the polarity will be so chosen, that said component migrates towards the filter element, i.e. migrates in the direction of the flow of the fluid through the filtering element.

The passage of the electric current generates heat in the solution, the amount of which can be calculated on the basis of the electric field applied and the conductance of the solution. This heat can be dissipated in two ways. One way is by means of the fluid itself which is being filtered. Thus, the fluid being filtered can act in the same time as its own cooling medium. As a result, the fluid leaving the filtering apparatus will be warmer than the incoming fluid. Each fluid has a different safe limit of temperature raise that it can tolerate. Thus, if biological material is being filtered, such as a protein solution, it will tolerate less temperature increment than a solution or suspension of polymers or of inorganic material. In many instances, therefore, additional cooling is necessary, and this can be carried out in many ways. For example, the contents of the electrode compartments can be continuously cooled, as they are circulated outside of the apparatus, cooling coils may be inserted inside the apparatus or into the walls thereof. In a multifilter apparatus, such as illustrated in FIGURE 4, cooling compartments can be also inserted between various filtering elements, which compartments are coextensive with the filtering compartments and are cooled by circulating cooling brine. For example, the compartment $B_3$ and $B_4$ of FIGURE 4, can be utilized for the circulation of a cooling brine, in which case the filtering element $F_2$ is omitted. These cooling compartments have to be separated from the other compartment by the previously described membranes, such as membranes $M_2$ and $M_3$.

The passage of electric current causes also the passage of non-colloidal electrolytes present in the fluid through the membranes. In order to minimize changes in concentration of electrolytes across the apparatus, it is convenient to have all the fluids in an apparatus of closely similar electrolyte content. These fluids comprise the fluid being filtered, the fluids contained in the two electrode compartments and the fluid employed as the cooling brine. One method to achieve this is by equilibrating all fluids against each other by dialysis.

In the description of the apparatus illustrated in FIGURE 3, it was mentioned that the filtering compartments may have one or two openings. In FIGURE 4, the same principle was maintained, the filtering compartments having alternately either one or two openings. The reason for it is that sometimes it is not convenient to allow all the fluid being filtered to actually pass through the filtering element. As an example, frequently it may be desired to withdraw part of the fluid from the filtering apparatus before it has passed through the filtering element. Such fluid will then be enriched in those components of the solution or suspension to which the filtering element was impermeable. This allows the filtering apparatus to be operated continuously for an indefinite period of time, as the components retained by the filter element do not remain in the apparatus but are carried out in the portion of fluid which did not pass through the filter element. Using as an example the apparatus illustrated in FIG. 3, the fluid to be filtered can be continuously introduced through the opening $O_3$, part of said fluid being withdrawn through outlet $O_4$ and the other part through outlet $O_5$. The fluid withdrawn through $O_5$ will be impoverished in any components retained by the filtering element, these components being carried out by the fluid withdrawn from the outlet $O_4$.

It has already been stated that it does not matter whether the filtering elements, and the whole apparatus are employed in the vertical, horizontal or inclined position. The two fluids, namely that which is introduced into the apparatus, and that which has passed through the filtering element, do not necessarily have, however, the same specific density. Thus, if the material retained by the filtering element is heavier than the suspending fluid, the solution after filtration will be lighter than before filtration. In such a case, it will be advantageous to maintain the fluid from the two sides of each filtering element in a gravitationally stable relationship. For example, if the filtering element is horizontal, the heavier fluid should always be below the filtering element, the lighter fluid above. If the filtering element is vertical, it will be advantageous to have the heavier fluid to be filtered, flow into the apparatus from the top (opening $O_3$ of FIGURE 3); the lighter fluid, after passage through the filtering apparatus, is withdrawn from the other top opening from the other side of the filtering element ($O_5$), while the portion of the fluid enriched in the components retained by the filtering element, and therefore still heavier, is withdrawn from the bottom of the first compartment (outlet $O_4$). In such a way, a countercurrent flow is realized in the cell, bringing about the maximum efficiency of the apparatus, while at the same time preserving gravitational stability therein.

The following examples illustrate the invention.

*Example 1*

This example is given to show how the invention is applied to prevent clogging of a filter.

A suspension of 1 percent by weight of wet brewer's yeast in distilled water was filtered under a hydrostatic pressure of 30 cm. water pressure in an apparatuts similar to that shown in FIG. 3 of the drawings, wherein Whatman filter paper No. 54 of an area of 15 cm.$^2$ was used as the filtering element.

When no electric field was applied, the filter became clogged and did not allow any further passage of fluid after the filtration of about 100 ml. of the suspension.

By the application of an electric field of 60 volts/cm., the fluid flow through the filter started again, and was maintained at a rate of about 2 ml./min. until a total of 1000 ml. was filtered, without showing any tendency to slowing in the filtering rate due to filter clogging. The polarity of the field was such that the inflow of the yeast suspension into the filter apparatus was from the side of the anode.

*Example 2*

In this example it will be shown how a filtering element which is normally permeable to a component of a solution or suspension, is made impervious to said component through the application of an electric field of suitable polarity. The filtering apparatus was similar to the apparatus used for Example 1, filter paper Whatman No. 54 being again employed as the filtering element. Its effective surface was 60 cm.$^2$. Citrated whole blood, as supplied by the American Red Cross for blood transfusions, was employed diluted with a solution containing 0.4% of sodium citrate and 4.4% of dextrose, to one half original concentration. The pH was adjusted to about 7.5, using sodium hydroxide. If no electrical field was applied, the suspension filtered through the filtering element without any noticeable change in composition. If an electric field was applied, its polarity being so chosen that the red blood cells migrated away from the filtering element, i.e. in the direction opposite to the flow of the liquid through the filter element, considerable change in composition of the filtered fluid was noticed. With the filter element in a vertical direction, and an electric field of 10 volt/cm., half of the inflowing fluid was allowed to pass through the filtering element, while half was withdrawn from the filtering apparatus without passage through the filtering element. In the portion of the fluid which had passed the filtering element, the concentration of the red and white blood cells, as well as of the serum albumin was reduced to less than 5% of the inflowing concentration. The concentration of gamma globulin in this portion of the fluid was not changed from the original concentration, this component possessing only negligible electrical charge. All the missing components from the filtered portion of the fluid were found in the portion of fluid withdrawn from the apparatus without passage through the filtering element. The rate of filtering of the blood through the filtering element was about 1.5 ml./min.

It will be seen from this example that the invention provides a fast and efficient method of recovering gamma globulin from blood serum or plasma, which may have been made stable against coagulation by the conventional addition of citrates or oxalates of the alkali metals and ammonium, heparin and the like.

*Example 3*

This example shows another instance in which the filtering element was made impervious to a component to which it was normally permeable through the application of an electric field.

The same experimental set-up as in Example 1 was employed. The fluid in this case was colloidal palladium catalyst, supplied by Baker & Co., Inc., under the trade name Baker Colloid 46. It contained 0.5 gm. of palladium per liter. The colloid solution was stable and did not change in appearance or composition on standing or passage through the filtering element without application of an electric field. Upon application of an electrical field of 50 volts/cm., 95% of the palladium was retained by the filtering element, if the filtering rate was maintained at 1 ml./min., the anode being again at the inflow side of the filtering element.

In the same manner, other noble metals such as platinum, silver, gold can be efficiently recovered from their colloidal solutions.

*Example 4*

This example shows how in the filtration of a solution, the application of an electric field selectively increases the rate of filtration of one component of a solution over that of the solvent. The employed solution was a 3% solution of human serum albumin in a 0.02 molar solution of sodium barbiturate, adjusted to pH 8.6. An apparatus like that shown on FIG. 4 was employed, but having 5 filter elements. The total filtering surface was 75 cm.$^2$, and the polarity of the electric field was so adjusted that the serum albumin was migrating in the direction of the fluid flow through the filtering element. A total of 200 ml. was filtered through the filtering element, constituted of Whatman No. 54 filter paper, at a flow rate of 1.5 ml./min. An equal volumt of the fluid was withdrawn from the apparatus at the same rate, but prior to passage through the filtering element. The electric field applied was 8 volt/cm. The 200 ml. collected through the filtering element had a final concentration of 5.8% of serum albumin, while the remaining fluid, which had not passed through the filtering element, had a concentration of only 0.1%. Thus, about 97% of serum albumin was filtered through the filtering element, though only 50% of the fluid has passed the filtering element. The resulting filtrate was about twice as concentrated than the original serum albumin solution.

It will be obvious that the invention is not limited to the shown apparatus but that an electrical field according to the invention may be applied to any type of filtering operation where non-metallic filtering elements are used, which are enclosed in, or separated from the filter solution by, semipermeable membranes or diaphragms.

I claim:

1. A method of continuous electrophoretic separation, purification, and concentration of aqueous colloidal solutions and suspensions comprising introducing continuously an aqueous colloidal solution into one end of an electrophoretic cell, passing said solution in the direction of increasing colloidal density along one surface of a colloid permeable non-metallic filter element extending inside said cell from said end where said solution is introduced to the opposite end of the cell, withdrawing part of the solution from said opposite end of the cell in the unfiltered state, thereby preventing accumulation of colloids in the cell, forcing another part of the solution through the filter element in a direction normal to the direction of flow of the solution along said element, passing the filtered solution along the other surface of the filter element in countercurrent to the direction of flow of the unfiltered solution, applying a direct electric current field between a pair of electrodes across the filter element and the solution passing along its two surfaces, said electrodes being separated from the solution and filter element by semipermeable membranes and adjusting the polarity of said current as to cause electrophoretic migration of an electrically charged colloidal component of the solution with respect to the direction of flow of the solution through the filter element, thereby increasing the concentration of said component in one of said parts of the solution said countercurrent flow of the filtered and unfiltered solution maintaining the electrophoretically produced concentration difference in said solutions.

2. A method as claimed in claim 1 comprising adjusting the linear rate of flow of said liquid through the filter element and the rate of electrophoretic transport of one of said components to about the same order of magnitude.

3. A method as claimed in claim 1 comprising orienting the polarity of said electric current so as to cause electrophoretic migration of one of said components within the filter element in the direction opposite to the direction of flow of said liquid through the filter element.

4. A method as claimed in claim 1 comprising orienting the polarity of said electric current so as to cause electrophoretic migration of one of said components within the filter element in the direction of flow of said liquid through the filter element.

5. The method as claimed in claim 1 comprising cooling said liquid to remove heat generated by the electric field.

6. A method as claimed in claim 1 wherein the electrolyte solution of said two electrode containing zones is recycled and combined during recycling.

7. An apparatus for filtering electrophoretically mobile colloid components suspended in a liquid, comprising a cell defined by two semipermeable membranes, a non-metallic colloid permeable filter element in said cell parallel to said membranes and dividing the cell into a first and second completely separate compartment, electrodes arranged respectively parallel to said membranes outside of said cell, inlet means to feed continuously a colloidal suspension into one end of said first compartment, first outlet means at the opposite end of said first compartment to withdraw continuously part of said suspension from said cell in the unfiltered state, and second outlet means at said second compartment located at the same end of the cell as the inlet means of the first compartment to withdraw continuously the filtered suspension.

8. An apparatus for filtering electrophoretically mobile colloid components suspended in a liquid comprising a cell having spaced electrodes therein, a plurality of semipermeable membranes between said electrodes defining narrow filter compartments, a colloid permeable non-metallic filter element in each of said compartments extending the whole length thereof parallel to said membranes, inlet means to feed continuously a colloidal suspension into said cell, first outlet means for withdrawing part of said suspension entering a compartment before passage through the filter element, and second outlet means for withdrawing filtered suspension, said inlet and second outlet means being located at one end of each cell and said first outlet means being located at the opposite end of the cell.

9. An apparatus as claimed in claim 8 wherein said inlet means comprise an inlet duct opening into all said filtering compartments.

10. An apparatus as claimed in claim 8 wherein said first and said second outlet means each comprise a duct connected with all of said filter compartments.

References Cited in the file of this patent
UNITED STATES PATENTS

| | | |
|---|---|---|
| 763,318 | North | June 21, 1904 |
| 1,022,523 | Whitney | Apr. 9, 1912 |
| 1,326,106 | Schwerin | Dec. 23, 1919 |
| 1,986,920 | Cross | Jan. 8, 1935 |
| 2,116,509 | Cottrell | May 10, 1938 |
| 2,251,083 | Theorell | Jan. 29, 1941 |
| 2,407,303 | Teale | Sept. 10, 1946 |
| 2,419,275 | Metzger | Apr. 22, 1947 |
| 2,500,878 | Sieling | Mar. 14, 1950 |
| 2,775,550 | Harlow | Dec. 25, 1956 |
| 2,799,638 | Roberts | July 16, 1957 |